(12) United States Patent
Lang et al.

(10) Patent No.: US 8,398,327 B2
(45) Date of Patent: Mar. 19, 2013

(54) SHAFT-HUB CONNECTION WITH TOOTHING

(75) Inventors: Walter Lang, Igersheim (DE); Karl-Georg Melber, Weikersheim (DE); Christof Old, Bad Mergentheim (DE)

(73) Assignee: Wittenstein AG, Igersheim (DE)

( * ) Notice: Subject to any disclaimer, the term of this patent is extended or adjusted under 35 U.S.C. 154(b) by 620 days.

(21) Appl. No.: 12/525,109

(22) PCT Filed: Jan. 30, 2008

(86) PCT No.: PCT/EP2008/000699
§ 371 (c)(1),
(2), (4) Date: Aug. 11, 2009

(87) PCT Pub. No.: WO2008/092648
PCT Pub. Date: Aug. 7, 2008

(65) Prior Publication Data
US 2010/0003075 A1  Jan. 7, 2010

(30) Foreign Application Priority Data
Jan. 31, 2007  (DE) .................. 10 2007 005 667

(51) Int. Cl.
*F16C 3/00* (2006.01)
*F16D 1/06* (2006.01)
*B23P 19/02* (2006.01)

(52) U.S. Cl. ................. 403/1; 464/182; 29/525; 29/557
(58) Field of Classification Search ............ 403/1, 359.1–359.6; 464/179–183; 29/525, 557, 558, 897.2, 525.11; 74/10.45
See application file for complete search history.

(56) References Cited

U.S. PATENT DOCUMENTS

| | | | | | |
|---|---|---|---|---|---|
| 2,147,343 | A | * | 2/1939 | Hokansom | 403/284 |
| 5,607,358 | A | * | 3/1997 | Stall et al. | 464/111 |
| 5,716,156 | A | * | 2/1998 | Bayer et al. | 403/282 |
| 6,298,556 | B1 | * | 10/2001 | Stall et al. | 29/898.07 |
| 7,387,462 | B2 | * | 6/2008 | Hacker | 403/359.6 |
| 8,020,299 | B2 | * | 9/2011 | Shirokoshi | 29/893.2 |
| 2005/0254890 | A1 | * | 11/2005 | Schulz et al. | 403/359.1 |
| 2006/0075838 | A1 | * | 4/2006 | Hacker | 74/10.45 |

FOREIGN PATENT DOCUMENTS

| | | |
|---|---|---|
| DE | 19517258 | 11/1996 |
| DE | 10302072 | 9/2004 |

* cited by examiner

*Primary Examiner* — Victor Macarthur
(74) *Attorney, Agent, or Firm* — Bachman & LaPointe, P.C.

(57) ABSTRACT

A method for producing a shaft-hub connection, in particular between a helically toothed pinion (2) and a hub (6), a partial section (3) of the helically toothed running toothing (4) of the pinion is used, during the connection to the hub, as a type of chip-removing cutting tool, by virtue of the partial section cutting with the profiles of its teeth into the hub in an axially aligned fashion.

10 Claims, 1 Drawing Sheet

SHAFT-HUB CONNECTION WITH TOOTHING

BACKGROUND OF THE INVENTION

The invention relates to a method for producing a shaft-hub connection, in particular between a helically toothed pinion and a hub, and to a suitable shaft-hub connection for this purpose, and to its use.

The term "shaft-hub connection" is used as a general concept in the present invention and it includes the wide range of variants such as, for example, a pinion, bolt, stem and the like for shaft, and such as, for example, a socket, planetary wheel carrier and the like for hub.

It is known to attach a pinion with a shaft in a receptacle part by pressing the pinion shaft with a straight-toothed or specially burred partial section into a bore of the receptacle part, in which case the toothed partial section cuts into the bore wall. DE 195 17 258 A1 describes, for example, such a pinion attachment. However, here the actual pinion is not involved with its running toothing in the hub connection but rather only the pinion shaft, which means that the size ratios between the diameters of the pinion and the pinion shaft are markedly different. The centering accuracy which is aimed at with such a connection is to be obtained here by virtue of the fact that the straight-toothed section of the pinion shaft is guided centrally in the bore in front of and behind said section when said pinion shaft is pressed into a corresponding bore.

Although such a shaft attachment has proven suitable, it requires a specific diameter ratio between the pinion and pinion shaft in order to obtain sufficient torsional strength.

In contrast, the present invention is based on the object of providing a method for producing a connection to a hub which ensures play-free attachment with high precision, on the one hand, and high torsional strength, on the other, in particular for helically toothed pinions with a relatively small head circle diameter, i.e. <150 mm. In addition, a suitable, in particular, pinion-hub connection is to be presented.

SUMMARY OF THE INVENTION

The first partial object is achieved according to the invention in a simple way by virtue of the fact that a partial section of the helically toothed running toothing of the pinion is used, during the connection to the hub, as a type of chip-removing cutting tool, by virtue of the fact that the partial section cuts with the profiles of its teeth into the hub in an axially aligned fashion.

In this context, the connection between the partial section of the helically toothed running toothing of the pinion and the hub is formed by virtue of the fact that the partial section is pressed or inserted in a guided fashion into the hub, in which case it is expedient because of the gradient of the helical toothing that the pressing or insertion is carried out with rotation. In this context, the aimed at, axially aligned connection is expediently obtained by virtue of the fact that the partial section of the running toothing of the pinion is positively guided axially on one side and centered by the pinion itself. In the case of rotational pressing in it is helpful that the partial section of the running toothing of the pinion is mounted at its free axial end in a freely rotatable fashion in the hub by means of a centering bolt, which can then follow the rotational movement despite the central guidance.

The positively locking cutting of the partial section, used as a type of cutting tool, of the running toothing of the pinion can be advantageously facilitated if an undercut, circumferential cut bevel is produced in the free axial end surface of the partial section; in this context an angle of 7.5° has proven suitable, but said angle can also be between 0° and 15°.

A second partial solution of the object according to the invention which has been proposed is a suitable shaft-hub connection, specifically in particular such a connection between a helically toothed pinion and a hub. This is distinguished by the fact that the pinion is cut with a partial section of its helically toothed running toothing in a positively locking fashion into the hub in axial alignment for connection to said hub, which is achieved by pressing in or inserting the partial section.

In structural terms, the partial section of the helically toothed running toothing of the pinion can have, on the one hand, coaxially a centering bolt at its free end for the axial guidance of said pinion, and, on the other hand, the partial section itself can serve for this purpose by virtue of the fact that its head circle diameter is made slightly smaller than the rest of the running toothing of the pinion.

These guide elements are used when the hub which is provided for the purpose of connection has a multi-step bore, in which case it is expedient that these individual steps of the multi-step bore are formed by an entry section as the first centering section, and a connecting section and a centering section as the second centering section. In this context, these bore sections have different axial lengths and are embodied with respective internal diameters of different sizes, and specifically they decrease in size in the pressing-in direction.

As far as the entry section of the multi-step bore of the hub is concerned, said entry section serves as a first guide element during the connection process, wherein this section can be made relatively short in its axial length in relation to the axial length of the following connecting section, and has an internal diameter which corresponds to the diameter of the head circle of the partial section of the running toothing of the pinion.

With respect to the connecting section of the multi-step bore in the hub it is sufficient if it corresponds in its axial length approximately to the axial length of the partial section of the running toothing of the pinion, reduced by the axial length of the entry section, wherein the internal diameter of this connecting section is expediently made slightly smaller than the diameter of the head circle of the partial section of the running toothing of the pinion so that positively locking, play-free cutting of the partial section of the pinion into the hub is obtained.

The centering section which follows the connecting section in the pressing-in direction advantageously has dimensions which correspond to those of the centering bolt which is provided coaxially at the free end of the partial section of the pinion.

In order to cut the partial section of the pinion more easily into the connecting section of the multi-step hub bore, a circumferential cut bevel, which is advantageously undercut with respect to the end ring surface with an angle between 0° and 15°, in particular 7.5°, can be provided on the free end ring surface of the partial section of the helically toothed running toothing of the pinion.

The method described at the beginning for producing a shaft-hub connection is suitable, in particular, for producing the pinion-hub connection which is presented, and the latter can preferably be used in pinions with a diameter of the head circle <150 mm, in particular <50 mm, preferably <20 mm. With these dimensions and given the presence of virtually a solid shaft for transmitting torques, i.e. no division into pinions and pinion shaft, it is not possible, in particular when there are relatively high torsional loads, for damaging stress peaks (notch stresses) to occur, as may be the case with stepped shafts.

Furthermore, the scope of the present invention is intended to include the fact that preferably the first partial section of the helically toothed running toothing of the pinion cylindrically or else in a positive or negative clearance angle α1, α2 of −5° to +5°. The partial section with helically toothed running toothing can therefore be embodied in such a way that it tapers or widens slightly in a conical fashion with respect to the actual pinion in order to form a clearance angle, in order, in particular, to optimize or influence cutting in or a cutting-in process. In the tapered embodiment, a clearance angle is formed, with the result that the cutting-in forces are minimized, and in the embodiment which is widened conically outward, the cutting-in forces would have increased less at the beginning, and continuously as a function of the clearance angle α1, α2 during the entire cutting-in and pressing-in process.

BRIEF DESCRIPTION OF THE DRAWINGS

Further features and advantages of the present invention emerge from the following description of preferred exemplary embodiments and with reference to the drawing, in which.

DETAILED DESCRIPTION

Figure 1:
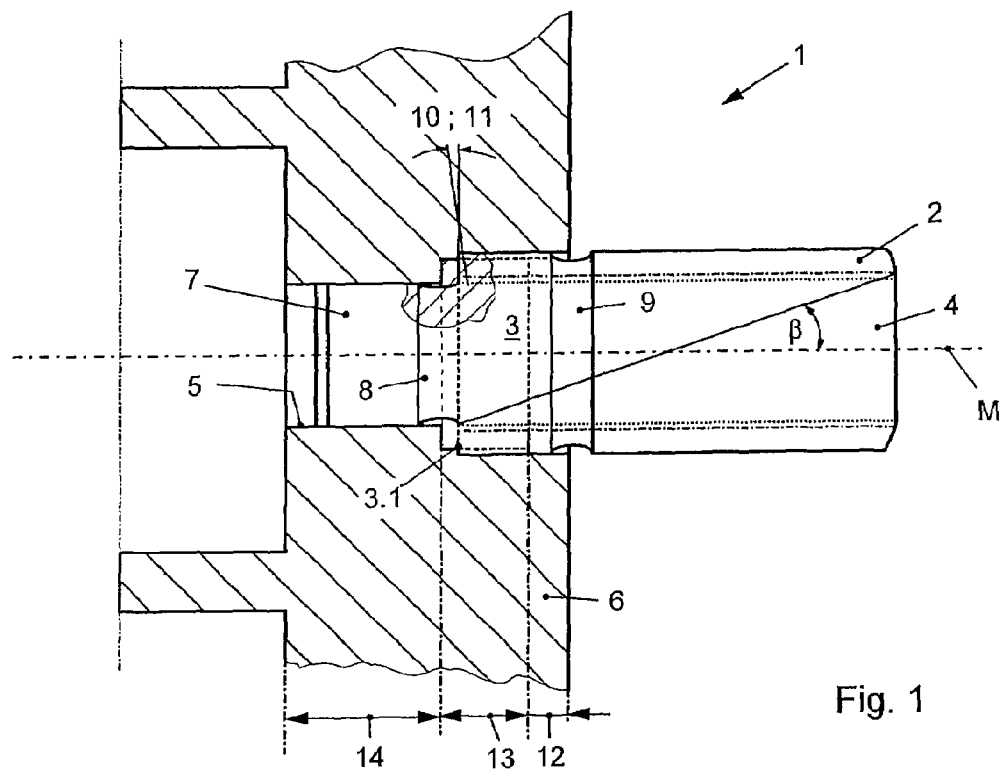
FIG. 1 shows a section through a partial section of a pinion which is completely inserted into the multi-step bore of a hub section.

The illustrated shaft-hub connection is specifically a pinion-hub connection 1 in which a pinion 2 with a partial section 3 has a helically toothed running toothing 4, wherein the pinion 2 is pressed with the partial section 3 into a multi-step bore 5 of a hub 6. The partial section 3 has coaxially a centering bolt 7 at its free end, which centering bolt 7 is stepped with respect to the end ring surface 3.1 of the partial section 3 by an indent 8, wherein an indent 9, as a result of which possible notch stresses can be avoided, is provided between the partial section 3 and the rest of the running toothing 4.

In order to cut better into the partial section 3, a circumferential cut bevel 10, which has an undercut angle 11 of approximately 7.5°, is located at the free end ring surface 3.1 of the partial section 3 of the helically toothed running toothing 4 of the pinion 2. The partial section 3 therefore acts as a type of cutting tool.

The multi-step bore 5 of the hub 6 is composed of an entry section 12, a connecting section 13 and a centering section 14. Here, the entry section 12 has an axial length of approximately 30% of the following connecting section 13, and has an internal diameter which corresponds to the diameter of the head circle of the partial section 3. The axial length of the entry section 12 can be between 25 and 35% of the axial length of the connecting section 13 here, depending on the size ratios of the pinion-hub connection. The entry section 12 is associated with the aimed at concept of multiple centering at at least two locations, i.e. when the partial section 3 dips into the connecting section 13 by means of the cut bevel 10 the pinion 2 together with the centering bolt 7 is once more positively guided centrally here, with the result that a rotationally fixed, axially aligned connection is produced between the pinion 2 and the hub 6.

The connecting section 13 of the multi-step bore 5 has an axial length which corresponds approximately to the axial length of the partial section 3, but reduced by the axial length of the entry section 12, wherein the internal diameter of the connecting section 13 is made slightly smaller (between 5 and 10%; 7% in the present exemplary embodiment) than the diameter of the head circle of the partial section 3 so that there is sufficient "flesh" into which the teeth of the helical toothing of the partial section 3 can cut when chips are formed.

The centering section 14 which follows the connecting section 13 is finally embodied in accordance with the dimensions of the centering bolt 7, specifically with a form fit which, however, permits the rotational movement between the centering bolt 7 and the centering section 14 which is necessary when the helically toothed partial section 3 is pressed in rotationally. At the same time, the region between the pinion 2 and the hub 6 is sealed by the centering bolt 7.

The method according to the invention for producing the pinion-hub connection 1 according to the invention is as follows: as the pinion 2 is pushed into the multi-step bore 5, the partial section 3 is cut in a chip-forming fashion, using the cut bevel 10 into the internal wall of the connecting section 13 with simultaneous pinion centering, already occurring before the start of the cutting in process, as a result of the previous dipping of the centering bolt 7 into the bore of the centering section 14, and the dipping of the partial section 3 into the bore of the entry section 12. This axially aligned pushing in, i.e. this axial pressing process, takes place with rotation of the pinion 2 in the counterclockwise direction corresponding to the gradient of the helical toothing until the pinion 2 is countersunk, with its partial section 3 serving as a type of cutting tool, into the multi-step bore 5.

Overall, the proposed method and the proposed pinion-hub connection provide, in particular in conjunction with a helical toothing, a rotationally fixed, play-free attachment of a pinion in a hub, which attachment is capable, due to its virtually solid-cylindrical design, of transmitting relatively large torques including axial forces (by virtue of the helical toothing). In contrast to a knurled connection, the precisely defined and processed tooth shape permits, in particular in the case of the helical toothing, a particularly play-free and rigid shaft-hub connection with high precision, while at the same time the risk of shearing off at the hub or of slipping through in the hub advantageously no longer exists with the present invention.

In the present invention, the helically toothed running toothing 4 in the pinion 2 is formed continuously with the subsequent partial section 3. It is possible to provide just one indent 9 between the partial section 3 and the pinion 2. However, this is not absolutely necessary.

The running toothing 4 encloses an slope angle β of approximately 1° to 30°, preferably 6° to 14°.

The external lateral surface of the running toothing 4 is shaped cylindrically both in the region of the pinion 2 and in the region of the partial section 3.

Figure 2:
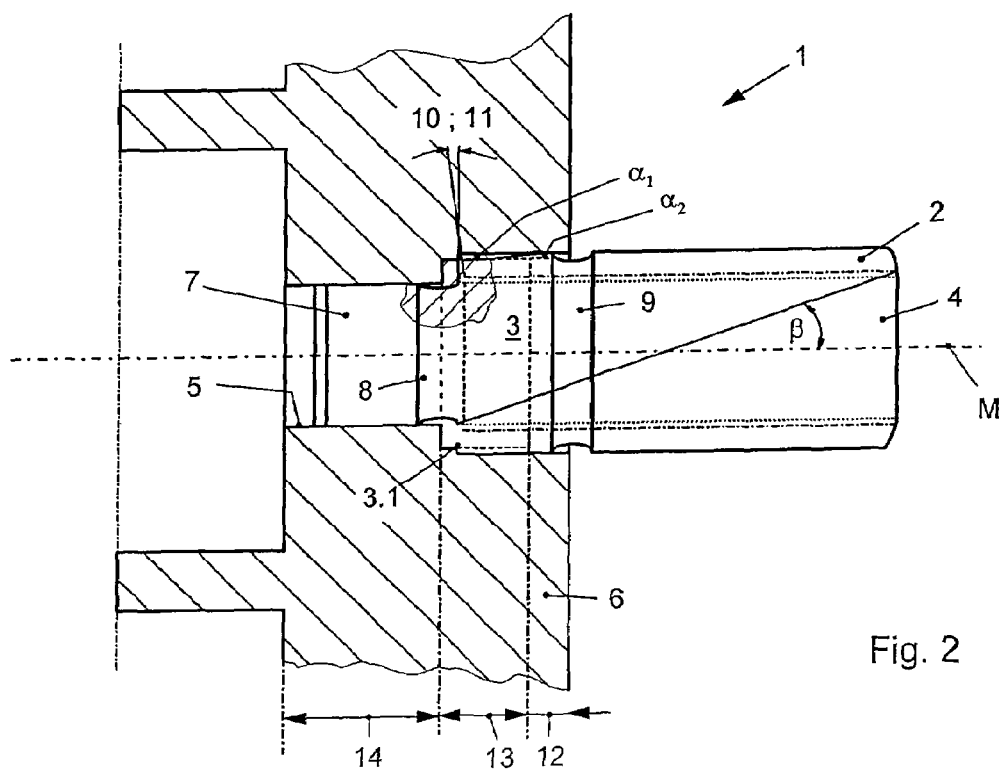
FIG. 2 shows a section through a further exemplary embodiment according to FIG. 1.

In many applications, it has proven advantageous to provide the running toothing in the region of the partial section 3, in particular in the region of the lateral surface, with a positive or negative clearance angle $\alpha_1$, $\alpha_2$, as is indicated, for example, in FIG. 2. In the case of $\alpha_1$ a negative clearance angle of 0° to −5° is indicated, and in the case of $\alpha_2$ a positive clearance angle of 0° to +5° is indicated. The external lateral surface can either taper conically toward the pinion 2, or widen conically outward or taper conically toward the centering bolt 7. In this way, it is possible to influence a cutting-in behavior and, in particular, a cutting-in process and a pressing process, with the result that initial forces and pressing forces are minimized and cutting in is optimized at the beginning.

The configuration of the negative clearance angle $\alpha_1$, $\alpha_2$ can also be advantageous in significantly optimizing a cutting-in behavior. This is also intended to lie within the scope of the present invention.

The invention claimed is:

1. A shaft-hub connection comprising:
a hub having a multi-step bore comprising a first step of diameter $d_1$ and a second step of diameter $d_2$ wherein diameter $d_2$ is greater than diameter $d_1$; and
a pinion having a centering bolt portion and a partial section portion, said partial section portion having a helically toothed running toothing and a circumferential cut bevel having an undercut angle, said centering bolt portion is received in the first step and the circumferential cut bevel is cut into an interior surface of the second step defining diameter $d_2$ to positively lock the hub to the pinion, wherein the circumferential cut bevel is undercut with respect to an end ring surface with an angle of <15°, a first elliptical shaped indent is provided between the partial section of the helically toothed running toothing of the pinion and the rest of the running toothing of the pinion and a second elliptical shaped indent is provided between the partial section and the centering bolt wherein the first and second indents relieve any possible notch stresses.

2. The shaft-hub connection as claimed in claim 1, wherein a diameter of a head circle of the partial section portion of the helically toothed running toothing on the pinion is slightly smaller than a diameter of a head circle of the rest of the running toothing of the pinion.

3. The shaft-hub connection as claimed in claim 1, wherein the multi-step is formed by an entry section as the first centering section, and a connecting section and a centering section as the second centering section, wherein these bore sections have different axial lengths and internal diameters of different sizes.

4. The shaft-hub connection as claimed in claim 3, wherein the entry section of the multi-step bore of the hub is shorter in axial length than the axial length of the connecting section, and has an internal diameter which corresponds to the diameter of the head circle of the partial section of the running toothing of the pinion.

5. The shaft-hub connection as claimed in claim 4, wherein the connecting section of the multi-step bore corresponds in axial length to the axial length of the partial section of the running toothing of the pinion, reduced by the axial length of the entry section of the multi-step bore.

6. The shaft-hub connection as claimed in claim 3, wherein the internal diameter of the connecting section of the multi-step bore is made slightly smaller than the diameter of the head circle of the partial section of the running toothing of the pinion.

7. The shaft-hub connection as claimed in claim 3, wherein the centering section which follows the connecting section corresponds in its dimensions to those of the centering bolt which is provided coaxially at the free end of the partial section of the helically toothed running toothing of the pinion.

8. The shaft-hub connection as claimed in claim 1, wherein the running toothing encloses a slope angle ($\beta$) with respect to a central axis (M) of the pinion of 1° to 30°.

9. The shaft-hub connection as claimed in claim 1, wherein in a region of the partial section in a region of an external lateral surface, the helically toothed running toothing encloses a clearance angle ($\alpha_1$, $\alpha_2$) with respect to a lateral surface of the pinion which is in the range from −5° to +5°.

10. The shaft-hub connection as claimed in claim 1, wherein the undercut angle is about 7.5°.

* * * * *